United States Patent
Thomas et al.

(10) Patent No.: US 12,417,713 B1
(45) Date of Patent: Sep. 16, 2025

(54) USE OF REAL-TIME AND STORABLE IMAGE DATA STREAM FOR GENERATION OF AN IMMERSIVE VIRTUAL UNIVERSE IN METAVERSE OR A 3-D HOLOGRAM OR IMAGE, FOR TEACHING AND TRAINING STUDENTS

(71) Applicants: Mammen Thomas, Seattle, WA (US); Arun Mammen Thomas, Dublin, CA (US)

(72) Inventors: Mammen Thomas, Seattle, WA (US); Arun Mammen Thomas, Dublin, CA (US)

(*) Notice: Subject to any disclaimer, the term of this patent is extended or adjusted under 35 U.S.C. 154(b) by 0 days.

(21) Appl. No.: 18/985,398

(22) Filed: Dec. 18, 2024

(51) Int. Cl.
| | |
|---|---|
| *G09B 23/28* | (2006.01) |
| *G06T 19/00* | (2011.01) |
| *G09B 9/00* | (2006.01) |

(52) U.S. Cl.
CPC .............. *G09B 9/00* (2013.01); *G06T 19/003* (2013.01); *G06T 2219/024* (2013.01)

(58) Field of Classification Search
CPC ..................................................... G09B 23/28
See application file for complete search history.

(56) References Cited

U.S. PATENT DOCUMENTS

| | | | | |
|---|---|---|---|---|
| 5,227,898 | A * | 7/1993 | Iavecchia ................. | G03H 1/28 359/9 |
| 9,554,772 | B2 * | 1/2017 | Thomas ............... | A61B 5/7425 |
| 9,931,084 | B2 * | 4/2018 | Vesto .................. | G05B 19/4099 |
| 10,672,288 | B2 * | 6/2020 | Ribeira .................. | G16H 20/10 |
| 11,273,003 | B1 * | 3/2022 | Haider ............... | G02B 27/0093 |
| 11,468,791 | B2 * | 10/2022 | Jarc .......................... | G09B 23/28 |
| 11,551,578 | B2 * | 1/2023 | Eggert ...................... | G09B 5/14 |
| 12,106,678 | B2 * | 10/2024 | Stone ................... | G09B 23/285 |
| 12,210,668 | B2 * | 1/2025 | Quarles .................. | G06V 40/10 |
| 2016/0314716 | A1 * | 10/2016 | Grubbs ................ | G09B 23/306 |
| 2018/0098813 | A1 * | 4/2018 | Nesichi .................. | G09B 23/28 |
| 2020/0038119 | A1 * | 2/2020 | Geri ......................... | G06F 16/53 |
| 2022/0245880 | A1 * | 8/2022 | Thielen ................. | G06T 19/006 |
| 2022/0373795 | A1 * | 11/2022 | Latapie ................. | H04L 65/403 |
| 2023/0419855 | A1 * | 12/2023 | Wallace ................... | G06T 13/40 |
| 2024/0013672 | A1 * | 1/2024 | Kostyushov ........... | G16H 40/63 |
| 2024/0221518 | A1 * | 7/2024 | Qayumi ................. | G16H 40/20 |

* cited by examiner

*Primary Examiner* — Kurt Fernstrom

(57) ABSTRACT

A method and process for providing three dimensional (3-D) virtual image in metaverse or 3-D hologram for teaching students. The avatar of the teacher imitates the actions of the teacher performing teaching, and experiments in a lab or a doctor doing procedures in the operating theater, can virtually engage with the students. The image data stream generated in real time can be saved in a database for later re-creation of the images. The images which are spatially coordinated and updating in time are usable for review and teaching. The Metaverse shows all image details collected by one or more imaging systems and combined. It is a practice tool for learning with the teachers providing direction and feedback as avatars in the metaverse. The image in Metaverse provides critical visual capabilities for 3-D display With capability to virtually enlarge for detailed viewing of areas during the learning and teaching process.

17 Claims, 3 Drawing Sheets

Figure 1:
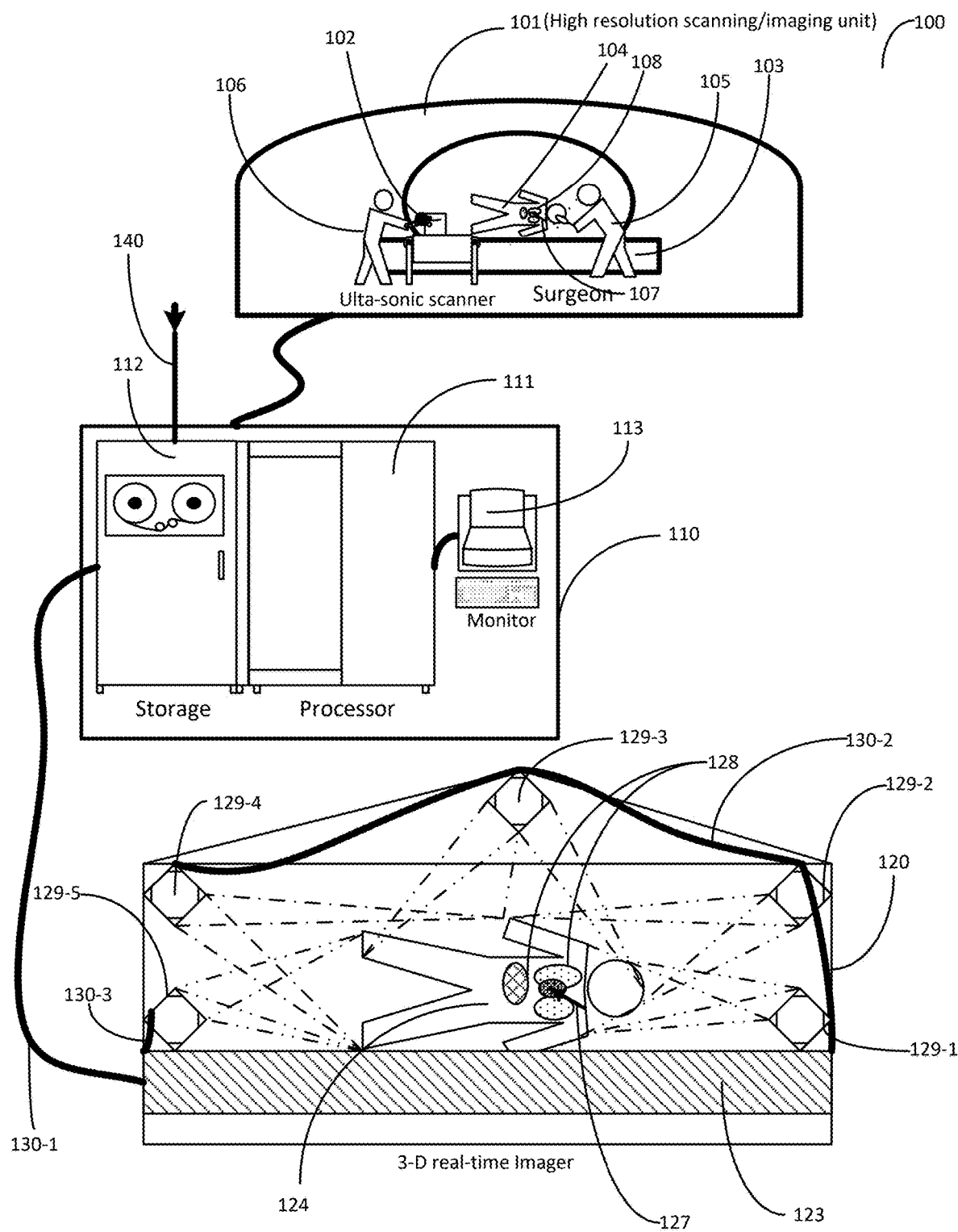

USE OF REAL-TIME AND STORABLE IMAGE DATA STREAM FOR GENERATION OF AN IMMERSIVE VIRTUAL UNIVERSE IN METAVERSE OR A 3-D HOLOGRAM OR IMAGE, FOR TEACHING AND TRAINING STUDENTS

FIELD OF INVENTION

This invention addresses the need of the teaching community to visualize in in multi-dimensions, the field comprising teachers, the surround of the teachers, the labs, and the location of instruments during experiments or procedures using virtual reality metaverse environment. Specifically, the use of such visualization, within a virtual universe of Metaverse or a 3-D holographic image, as a teaching and training tool.

DESCRIPTION OF WHAT IS AVAILABLE AND REASON FOR THE INVENTION

Today most of the teaching is in classrooms where the teacher and students interact. This is changing rapidly as more and more schools and colleges implement remote learning capabilities. Typical remote learning today happens over the web, using interactive screens such as Skype or Microsoft teams. Though these provide a level of capability for interaction between a teacher and student, it is on a much limited scale than the teacher-student interaction in laboratories and classrooms.

The use of the virtual universe of metaverse and holographic 3-D imaging and even the 3-D screen images can provide a much more close and interactive experience to the student interacting with teachers in virtual classrooms and laboratories where experiments and procedures are conducted and taught. Such systems by enabling closer student and teacher involvement will enhance the student teacher interactions and provide a much richer learning environment for the student and satisfaction to the teachers. As examples, one of the most critical teaching situations happens in teaching 1) lab experimentations in science and another 2) teaching medical/veterinary students surgical procedures. The second if these is being discussed in this application as the example of choice without it being considered as a limiting example. Other similar and difficult teaching instances will certainly exist and will be known to practitioners of the art. All such instances and examples are covered by the application. By generating using imaging systems and scanners, a field of view of a volume comprising the teacher, the surround of the teacher, the laboratory, the site of the experiment being done and the instruments used as a three dimensional image data stream, it is possible to generate a virtual interactive metaverse or a 3-D holographic image for a remote student to interact with. Such an interactive environment where the student can be virtually present will be extremely useful especially in teaching complex subjects using lab experiments and scientific concepts and experimentation as well as medical and surgical procedures. The interactive environment will benefit teaching of scientific ideas by experimentation and medical and surgical procedures in the operating theaters, by involving the student as a virtual entity while the procedures are being conducted in a lab or an operating theater. The teachers, the scientists, the surgical staff and the students can all be virtually present in the metaverse as avatars and the students as avatars can interact with the teachers in the lab or with the surgical staff in the operating theater to understand, raise questions and clarify the experiments or procedure being conducted.

DESCRIPTION OF INVENTION

A method and process for providing three dimensional (3-D) virtual image in metaverse or 3-D hologram for teaching students. The avatar of the teacher imitates the actions of the teacher performing teaching, and experiments in a lab or a doctor doing procedures in the operating theater, can virtually engage with the students. The image data stream generated in real time can be saved in a database for later re-creation of the images. The images which are spatially coordinated and updating in time are usable for review and teaching. The Metaverse shows all image details collected by one or more imaging systems and combined. It is a practice tool for learning with the teachers providing direction and feedback as avatars in the metaverse. The image in Metaverse provides critical visual capabilities for 3-D display With capability to virtually enlarge for detailed viewing of areas during the learning and teaching process.

SUMMARY OF INVENTION

The inventive idea is to provide a system for enabling teaching of students, the system comprising one or more sensing or scanning units or systems that a generate a data stream of a volume of a region under sensing that comprise a teacher and his surrounding including the site of experiment. One or more processors e receive the data from the sensors or the sensing and scanning units, when processing is required and process and combine the data to output a consolidated and combined image data stream that is being updated continuously. The in put data from the different sensors used are typically spatially aligned using pre-established alignment capability, established within the sensed volume.

The sensed volume that includes the teacher and his surround comprises the laboratory where the experimental set-up is established. The volume and surround including the teacher in the case of a medical teaching set up may comprises an operating theater where students are taught operating procedures on patients. The system typically will comprise more than one sensing/scanning unit or systems where the sensing/scanning systems comprise sensing and scanning systems or units that have varying resolutions and processing requirements. In most instances the more than one sensing/scanning systems comprise some real-time sensing and scanning systems and sensors and some sensing and scanning systems, the data collected from them requiring extensive processing to cobine and produce the data stream.

The scanning/sensing system comprising pre-defined reference points for providing the alignment capability to align the sensed or scanned data from the more than one sensing/scanning systems where necessary to establish spatial coordination of the streame data output of the sensed surround volume. The one or more processors receive scan data from the more than one scanning systems and combine using the reference points in the scanned volume to generate the image data stream with spatial coordination. The system comprise at least a memory coupled to the processors to store the image data stream for future retrieval when needed for teaching and training purposes.

The image data stream generated and output is enabled to generate an image of the volume of the region, for use in generation of a virtual metaverse or a 3-D image. The generated metaverse or the 3-D image is usable for teaching and training of students immediately or later when retrieved from memory.

What is also shown is a method of combining image data generated from multiple sensing/scanning units or systems of a sensed volume, that may be a lab or an operating theater, the method comprising receiving by one or more processors the data from the multiple diverse types of scanning and sensing systems, some that does not need processing and some that need processing before combining together, processing the data as required and combining the data to generate a data stream of a field of coverage comprising the sensed volume of the sensed region that is the class room, the lab or the operating theater where teaching happens. The multiple diverse types of scanning and sensing systems typically comprise high-resolution scanning/sensing systems and real time scanning/sensing systems.

The method of generating a data stream of the volume of the region where the data stream of the volume of the region comprises the teacher, the surround of the teacher, the class room or the laboratory or an operating theater. The data stream will further include and display the the instruments and their use and a site of the experiment and any other procedure.

The processors used are able to process and combine the sensed data from multiple diverse types of scanning and sensing systems to output an image data stream that is continuously updated over a period of time. The sensed data from multiple diverse types of scanning systems are combined by the processor using pre-defined reference points established within the volume field for alignment of the sensed data received from the multiple diverse types of scanning/sensing systems.

The image data stream output is used to generate a virtual universe of a metaverse or a 3-D holographic image of the field of scan that is used for teaching students. The updating image data stream is also saved in the memory associated with the scanning/sensing system for retrieval at a later date to teach students.

The use of the virtual universe of a metaverse or a 3-D holographic image used for teaching and training of students using the 3-D holographic image enable the involvement of students at remote locations in the process. The stored image data stream is further used to re-create the virtual universe of the metaverse or the 3-D holographic image for enhancing the understanding of the students by re engaging with them for teaching and training.

Typical Teaching Example Using Medical Teaching as the Primary Example

In the teaching field today, especially in medical teaching where robot assisted surgical procedures are conducted by the surgeon operating with a limited vision of the operating field, through microscopes and manipulating the instruments by what is visible in the narrow field of view through the optical cable inserted into the body with the surgical instrumentation. The surgeon has no real wide view of the operating area. There has been scanning and imaging technology such as magnetic resonance imaging (MRI), computed tomography (CT), X-ray, ultra-sound (ultrasonic imaging) etc. which are in widespread use in diagnostic fields. 3-D imaging technology is also available today, to a limited extend using the images generated which are being used, to a limited extend for diagnostic, teaching and training purposes. This has improved the capabilities existing for practice of nano-surgery and micro-surgery procedure (key-hole procedures) and made them more prevalent. Teaching of these medical advances to students is still a very difficult project as the surgeon/teacher and the student are both handicapped by reduced vision of the field of procedure. But as of now there are no capabilities for viewing the surgery or procedure in a virtual 3-D image projection where the individual surgeon doing the procedure can visually see what is being done in real-time in a simulated virtual environment or as an avatar in a virtual environment such as Metaverse. Similarly in the field of scientific teaching that is being conducted remotely, there is no capability for students to participate in experiments being done to teach complex scientific principles. This limitation exist for students who would like to learn the procedure/experiment being done by the scientist or the surgeon as avatars viewing the procedure in its fullness. Such a capability if available will be very useful to improve the efficiency of teaching the medical procedures and reduce the problems substantially for operations and for other invasive, non-invasive, minimally invasive, and key-hole procedures. Such a capability if available will also enhance the ability of the surgeon/teacher to engage with the students and explain the procedure or experiment while it is being performed. The students also will be able to ask questions and understand what is being done more fully and learn the procedure, the experiments its results and its complications from the teacher/expert.

As can be well understood one of the most complicated teaching problems exist in the teaching of surgical students in the medical colleges where the students have to follow the actions of the surgeon to learn the procedure and its intricacies. This aspect has been taken as an example without it being considered a limitation for implementation of the technology in other teaching fields. This has been analyzed as a first example in detail to provide an understanding of the complexity of the system and its implementation.

The MRI scanning and CT scanning are all techniques used today for diagnostic purposes. These sensed outputs are both high resolution data outputs. These high-resolution scanning and processing of the scanned data are used to generate usable information and images. But the process of image generation is slow and not real time. The images need to be reconstructed by mathematical computation which makes it a good and reliable diagnostic tool but not easily usable in real-time procedures or consultations during the procedures. As they are not real-time, they are not usable in procedures to see the location of the instruments inside the body as the procedures happen. This makes them not suitable, by themselves, for the applications which are covered by the current invention.

Low intensity X-ray and Ultra-Sonic scanning are two of the currently available other modes of imaging in use for real-time imaging in the medical field. These imaging systems provide fast image generation and display capability in real-time, but with somewhat lower resolution. All these above mentioned techniques are in use today mainly as stand-alone applications. It will be of use if a system and method can be found that provide real-time visual imaging capability with spatial coordination, such that virtual 3-D images and 3-D holograms can be generated and updated in real-time for conducting procedures with full visibility to the field of the procedure and instrument placement as the procedure is conducted. This capability of combining data outputs from different sensing systems and sensors to generate an image data stream if established, will also help generate and implement a virtual universe where the teaching medical practitioner/scientist can follow his own actions in real-time in the virtual reality universe, metaverse, that can be used for such purpose. Such a spatially coordinated virtual 3-D image and 3-D holograms where the medical practitioner or surgeon can be fully immersed in the virtual reality, will also enhance the capability to teach the students complex scientific ideas by experimentation and teach medical students automated robotic surgeries and implementation of procedures.

What is Needed Today to Remotely Teach Students

A method and process for providing a valid teaching environment using a three dimensional (3-D) virtual image of a patient in an operating theater or a teacher in a laboratory conducting an experiment is presented in metaverse for teaching the surgical or other procedures, as well as laboratory experimentation. In such environment the avatar of a medical practitioner in the operating theater imitating the actions of the group or individual, performing the procedure, can visually identify the organs and the location of the instruments in real-time inside patient. Similarly, a teacher conducting a complex experiment in an experimental laboratory (Lab) can have his avatar provide clear instructions and visual guidance to students who can also be present as their avatars during the experiment. Such image reconstruction capability with spatial coordination provides a usable metaverse implementation with the medical professional's persona or the teacher's persona as avatars that can interact with the students, becomes extremely usable as a training and supportive tool in scientific and medical and other teaching applications. It is a very valuable, especially, for teaching advanced concepts and the medical and surgical concepts to students who can also be involved as avatars/virtual entities to observe, question and understand the procedure and the results. The implemented Metaverse provides all details collected and combined from the multiple imaging systems. It is usable as a teaching tool, a diagnostic tool, a practice tool a teaching tool and real time direction and feedback tool by the teachers at all levels including for the advanced Science and medical teachers. The real-time image implemented as Metaverse hence provides critical visual capabilities during procedures and experiments.

What is further proposed here is the use of a plurality of imaging systems used together optimally and in spatial alignment to provide a detailed view of the teaching facility being used, during a process or experiment. In the typical laboratory setting optical, infra-red and similar types of imaging systems can be used while in the medical surgical field more sophisticated scanning systems like ultra-sonic or low intensity X-ray and similar real-time imaging techniques, that are fast imaging techniques providing real-time imaging capability have to be used in conjunction with high resolution scanning techniques that provide clear high resolution imaging capabilities, such as MRI or CT, for generation of spatially aligned real-time continuously updating 3-D image data of patients under procedure. The idea is to use the collected data stream outputs to be combined and used to generate a 3D virtual image of the patient and the operating environment or the lab and the experiment being done as a virtual universe, to be presented to the students and the teacher/scientist, or medical practitioner all within the metaverse, thereby providing enhanced real-time visual capability to the surgeon or teacher for explaining and teaching the critical steps and procedures while enabling the students to be virtually present and participate with the teacher in the procedures enhancing the learning process of the students. This is a new field of application which the inventors believe is an emerging and highly useful field in application of 3-D and virtual reality. By making the collection of data more personalized by embedding the necessary sensor devices in the clothing, gloves, of the teacher/surgeon and also having sensors attached to the instruments used, it is possible to make the activity within the environment fully visible and followable in real-time in the 3-D image or metaverse. In the 3-D image or metaverse each individual will be represented as his/her avatar and the activity of the individual will be visible as the activity of the avatar enabling full visual control of actions with full spatial coordination.

Invention Explained with the Medical Example

The present invention is aimed at providing the medical students and practitioners of both medical and veterinary community, tools to conduct invasive or minimally invasive procedures with full visibility and control using spatially aligned real-time updating 3-D holographic images within a virtual reality universe, such as immersive virtual reality metaverse platform, in real-time, for guidance of tools and placement of medicines while enabling real-time viewing, direct interaction and follow-up by the surgical team and experts. The students and experts are all represented as avatars within the metaverse during the procedure itself, enabling learning by the students. The invention is also an enabler, using metaverse with fully immersive 3-D virtual image and 3-D holograms for improving the diagnosis of problems, planning of procedures, identifying problem areas early, improving the capability to do remote viewing and consultation with experts in the field, thereby reducing the cost and improving success rate of procedures. This invention also provides the capability to practice procedures virtually within the metaverse environment, outside of the patient's body on the 3-D holographic image of the actual individual patient in metaverse, prior to start of procedure, so that the team becomes familiar with the procedure and the nature of the individual's complexities, before starting the procedure, thereby reducing the time taken, reducing risk, and improving success rate for any complex procedure undertaken.

The present invention using immersive metaverse virtual reality is enabled by combining of image data generated by multiple scanning systems/imaging systems, using pre-defined reference points within and around the patient and the location of the procedure as a basis to generate and update and combine real-time image data with previously acquired image data to provide the capability for generating real-time 3-D virtual image or a 3-D holographic image of an object, region or a person within the field of the scans for generating a fully updated real-time metaverse virtual reality environment presented within the virtual reality universe.

Computed Tomography (CT) scan that use either high energy X-rays or Gama rays, and standard X-ray imaging, though much have improved over the past years to provide good images using lower radiation levels, still damage the tissues due to accumulated radiation dosage. They are capable of low distortion images and deeper penetration through bones and underlying tissues to generate the images. Magnetic resonance imaging (MRI) using magnetic resonance scanning techniques are also very accurate and can produce accurate and detailed images of the human body sections. The problem is that such high-resolution scans require long scanning times with mathematical computations that induce time delay. Hence using these scanning techniques by themselves are not feasible to generate and display useful real-time images that can be used to provide the real-time virtual reality images within the metaverse. MRI further limits the use of instruments that are made with certain metals that are magnetic, which also limits its use in many real-time procedures. All these scanning methods are used today for support and verification of diagnosis. 3-D images usable as a basis for virtual reality can be generated from these scans but these scanning and subsequent imaging techniques are not suitable at present for continuous real-time monitoring and display of the field of procedure using immersive metaverse application. (Though in future we can expect the x-ray sensitivity to be increased for detection, making very high-resolution images possible with very low dose X-ray radiation, thereby making x-rays a viable tool for real-time image generation. Time limitations for computation of image from MRIs and CT scans are also expected to change with the increased speed of computing systems enabling computational capabilities for generating fast 3-D images, such as holographic images, in future). Currently, ultra-sound scanning and imaging has poorer image definition but does not cause permanent harm to the tissues due to exposure to harmful radiation and is a good tool to identify soft tissue regions within the body. It also has no limitation on use of metallic tools within its range for procedures. Hence a combination of the initial scanning using any of the high-resolution scanning systems, forming a basis for generation of images in metaverse, with real-time updating of the immersive virtual metaverse display, by ultra-sound (ultra-sonic scanning) or low energy X-ray or similar real-time scanning capability, will provide the best choice for generation of real time 3-D images, for use in virtual reality metaverse and 3-D holograms. At present ultra-sound scanning is the scan of choice for continuous real-time imaging during procedures, as described in at least one embodiment of the invention.

In order, to provide proper alignment between the multiple scanning techniques used for immersive metaverse, a set of accurate alignment points/objects need to be defined in the three dimensions, enclosing the field of interest which will remain constant and enable other references to be generated around the field of the procedure that reference these fixed alignment points and objects. The set of alignment points and objects enable the scan data from different scans to be combined using the references established to eliminate displacement errors when combining and updating 3-D image data that allow the 3-D images to be generated and displayed in virtual reality metaverse or as 3-D holograms. The preference is to have fixed alignment points and objects that do not change shape, as a primary reference. Some of these alignment points and acoustic or X-ray registration points and reference objects can also be defined in or around, the patient within the region of the procedure and these may be setup as primary reference point and if not feasible as secondary reference points which reference the the fixed alignment points that are the primary reference for spatial alignment.

Ultra-sonic imaging is a non-invasive technique that can be used to generate the overall image of the field of operation in real-time. This imaging method is very useful in soft tissue areas as indicated earlier. Current advances in ultra-sound or ultra-sonic imaging have included the capability to detect multiple objects (objects within or on surface of other objects, identification of nerves and blood vessels within the body etc. Ultra-sonic imaging technique does not have long term harmful effects that the high power X-ray imaging has, hence it is preferable to use Ultra-sonic imaging or alternately, low power X-ray imaging, where ultra sound is not feasible or sufficient, for continuous real-time updating of display, including 3-D display within metaverse, for real-time monitoring and metaverse image update during procedure, with initial accurate high resolution imaging support from, MRI, CT, high power X-ray or other imaging technologies to develop a complete 3D Imaging basis such as to provide immersive metaverse 3-D images in virtual reality and 3-D holographic images of the field of interest. Such a combination image development with real-time update is what will make the metaverse usable for diagnostic imaging, for procedure planning purposes, as well as for real-time tracking during implementation of invasive or minimally invasive procedures in metaverse virtual reality with the physicians, physician's, assistants, and consultants. Such a capability will also be highly usable in medical procedures using robotics where the procedure can be followed in the metaverse environment using the avatar of the operators or consultants.

To generate the virtual reality universe of metaverse, the image data from these various scans produced are each converted to image data in a standard format that can be combined to produce the combined real time up-dated image data, using processing system, clustered systems or distributed systems having sufficient processing power. The combined image data is then converted to a usable format, usable to produce the virtual image, as display, in immersive metaverse virtual reality, or as 3-D holographic image of the patient showing details of the field of the procedure. The image produced from the data generated and provided within the metaverse virtual reality is continuously updated in real-time using the ultra-sound or low power X-ray scanning result. The standardizing, combining, and processing of the scan data to produce the combined image data to be used in the metaverse is using the processing power of, any one of a dedicated image processing system that is a stand-alone processing system, distributed processing with high bandwidth interconnect in a cluster system, or a fully distributed processing system on the web. The image data produced and updated in real-time is provided to an image generator, such as an image generator for virtual reality immersive metaverse or a set of hologram projection devices that generate the real-time virtual 3-D image using any of the available imaging techniques available. Such generated image is also made useable in the virtual universe of metaverse or 3-D hologram of the patient and the location of the procedure. The real-time image generated and used in the metaverse will provide the capability to view the patient and the field of procedure at differing magnifications, and from different orientations within the metaverse without affecting the spatial co-ordination and linkage established to the patient, to enable complete viewing of the procedure and increase the accuracy of the procedure. The metaverse thereby allows the surgical team and operating tools and equipment that may be further optionally equipped with tracking sensors for improved tracking of their movement in the virtual universe, an immersive virtual view/experience, of the operating field, in real-time, during implementation of the procedure. The optional use of appropriate sensors as indicated above enable improved and more exact tracking and display of the actions, as it happens in the real space, within the virtual universe of metaverse, at times more accurately and exactly than the ultrasound generated real-time image updates. Such a combination hence provides additional accuracy within the metaverse during procedures. During diagnostic and planning/practice stages, the 3-D holographic image or the virtual image in the metaverse can be used as an isolated procedure planning and training entity. But during procedure itself the image is placed in controlled spatial relationship to the patient under sedation for active and real-time observation of the procedure, with guided placement of instrumentation, for the procedure and for feeding/placement of targeted medication, using updates from the continuous monitoring real-time imaging scanners, typically ultra-sonic scanners or low power X-rays placed critically at spatially defined locations and any optional sensors used for tracking the instruments. This allows a complete 3-D view of the field of the procedure with updates in real-time within the metaverse virtual reality during the procedure. Such a capability is expected to be extremely useful for placement of targeted medicines and radio isotopes for cancer and other similar treatments.

The generation and use of the virtual imaging and 3-D holographic imaging capability allows the formation of an image which, in a typical case, may be a 3-D holographic picture, in real-time, to be used in the virtual reality metaverse for complete understanding and planning of the procedure ahead of time using the individual and the field of procedure itself as practice subject. The virtual image of the patient provided within the metaverse will reduce the time the patient has to be worked on and provide for pre-planning of possible complications before the procedure, making for higher safety and faster recovery. The images produced and made available within the metaverse during the procedure itself will be spatially associated with the patient and show the location of the tissues and organs and the location of the instruments in an immersive real-time relationship using the continuously updated display, within the metaverse, for monitoring and accurate execution of the procedure.

It should be noted that even though ultra-sonic scanners are the preferred continuous scanning and updating scanners of choice today, this can change as improvements in other scanner types are made or new combination scanners and sensors are developed, which provide equal or better capabilities for the continuous and real-time monitoring and display. It should also be noted that the improvement in ultra-sonic and other scanning methods and new development of scanning techniques may provide for replacement of currently used scanning/image capturing techniques indicated in this application as being used. Any such improvement/replacement of scanning systems or components of scanning systems are to be expected over time and is covered by the application.

The use of a spatially aligned virtual image, with real-time updating of the instrumentation and activities within the procedure field, enabling virtually immersive metaverse application, provides for improved visibility and accuracy of the procedure, while enabling monitoring and feedback by observing or assisting experts to reduce problems, in real-time, as avatars, during invasive or minimally invasive procedures. The reduced time taken and reduction in problems reduce the risk and trauma to the patient.

Objectives and Advantages of the Disclosure

Some of the clear advantages of the applied concepts are:
1. Possible pre-planning of the experimental and other procedures in a virtual reality metaverse or using a 3-D holographic environment, or medical procedure on the individual who is being considered for a procedure. The virtual environment of the metaverse or 3-D holographic image being generated by combination of multiple imaging techniques.
2. Improved capability for fully immersive diagnostic evaluation or experimentation and result analysis with consultation with experts at remote locations, within the metaverse, with full capability to view and study the problem and to suggest improvements to procedures.
3. Enable pre-implementation practice of any set-up and procedure within the virtual image in metaverse or using 3-D hologram, to identify, correct and get accustomed to the peculiarities and uniqueness of the procedure field.
4. Using continuous imaging for updating of the procedure field providing real-time viewing and monitoring capability within the virtual reality metaverse during procedure/experiment to see that there are no problems during the experiment or procedure.
5. Better visibility of the field in which the procedure or experiment is taking place with specificity of location and use of the instruments enabled with sensors around and also attached to instruments.
6. Capability to have remote procedures/experiment directed by experts, without them being present on location, using remote real-time execution monitoring within the immersive virtual metaverse capability.
7. Capability for the students to be present as avatars within the metaverse virtual reality environment/universe and participate, question and clarify issues from the expert/teacher conducting the experiment or procedure in real-time.
8. The ability to discuss the experiment/procedure and results in real time as avatars after the completion to clear up any doubts and review the results.

The Claimed Invention

Explanation/Definition of Terms

1. Scanning system and imaging system are used interchangeably. Typically, they comprise at least an image scanner and at least one image detector that generates the image data from the scan input.
2. 3-D image stands for three dimensional image.
3. Virtual reality may require specialized optical devices to be worn for viewing of the 3-D image and immersion in the virtual reality metaverse as avatars.
4. Metaverse is a term that in this application means an immersive 3-D virtual reality universe implemented with or without special visual paraphernalia.
5. Avatar in this application is a representation of an individual in the virtual reality metaverse. Each Avatar within the metaverse is representing an individual.
6. Avatars when implemented in metaverse can be designed to replicate the actions of the individual outside the virtual reality that it represents, within the virtual reality. The accuracy of such action replication on the display may be his/her avatar.
7. Use of Instruments and equipment if linked to their images can replicate and tack their movement improved by use of appropriate sensors that enhance the linkage between the individual and outside the virtual reality, within the virtual reality display. These movements can also be enhanced by use of appropriate sensors embedded within the instruments used.

DRAWING FIGURES

FIG. 1:—Is a typical and exemplary block diagram of a (medical imaging) system for the 3-D and virtual image generation with spatial coordination, for use in the virtual reality immersive metaverse or 3-D holographic image generation, as per an embodiment of the invention.

Figure 2:
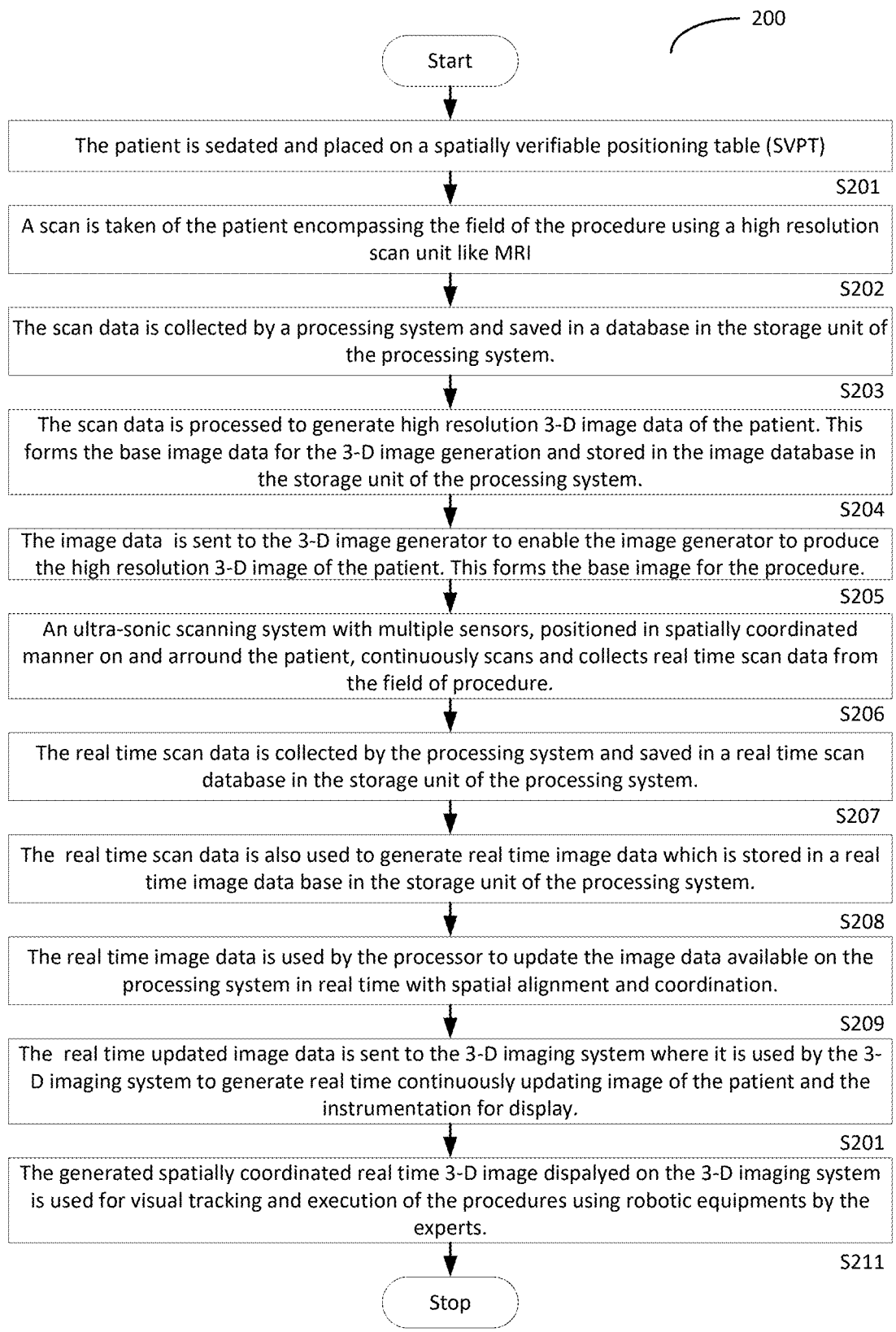

FIG. 2:—Is a flow chart of the use of the development of a spatially linked image for use in the metaverse for medical procedures using immersive avatars within the virtual reality metaverse as per an embodiment of the invention.

Figure 3:
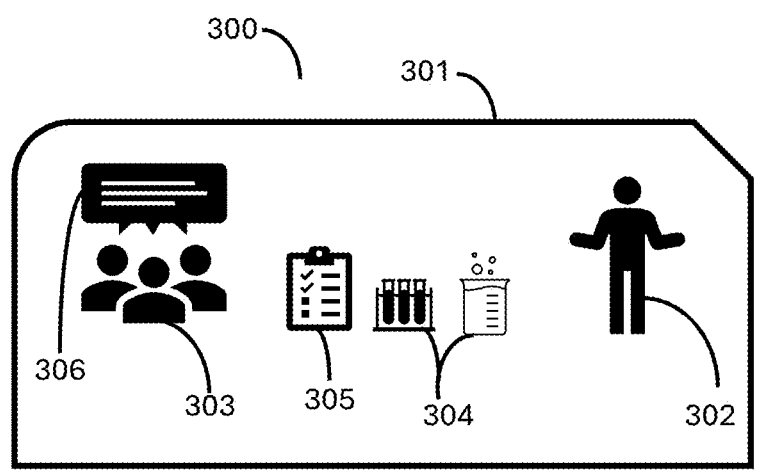

FIG. 3:—is a typical and exemplary block diagram of an embodiment of the invention where a teacher is conducting a scientific experiment and teaching the students in a Lab or class room setting.

DESCRIPTION OF THE INVENTION (USING THE MEDICAL TEACHING AS EXAMPLE)

A method and process is described for providing Non-Invasive immersive virtual image for use in metaverse applications (e.g. a three dimensional holographic image) of the patient in a spatially coordinated and updatable manner, such that during surgical or other procedures the persons performing the procedure, or acting as advisors can be virtually immersed in the metaverse as his/their own avatars during conduct of the procedure with visual identification of the organs and the location of the instruments in real time inside the body. Hence a spatially aligned non-invasive imaging and reconstruction for fully immersive virtual applications in metaverse or for 3-D holographic image generation using any available image generator, such as a 3-D projector, generating a virtual image of the patient for use in metaverse, will be a very valuable tool to the surgical community. The high-powered computing capabilities, including cluster processing and distributed processing capabilities with high band width interconnection combined with the modern advances in fast imaging virtual imaging techniques, individually or in combination, combined with noise filtering and error correction capabilities, have made accurate virtual imaging for metaverse applications and 3-D holograms from scans a reality. These immersive virtual images (within metaverse) are usable as a diagnostic tool and implementation tool by the medical community. It can also be a valuable teaching tool. There may also be other applications in medical and veterinary related areas which may emerge as the technology develops and new use cases become apparent to individuals practicing the art.

By using these spatially coordinated, real time, immersive virtual metaverse capabilities and holographic or other available types of image capabilities during surgical or other procedures, with the medical professional performing the procedure immersed in the virtual reality metaverse as avatars, are able to enhance the capabilities provided to the professional to visually identify the organs and the location of the instruments in real-time inside the body of the patient. By replicating the motions of the medical professional, the avatar within the metaverse is able to act in a manner that makes the procedure accessible to the medical professional outside the metaverse. The advances in the scanning techniques, such as X-ray, CT-scans, nuclear medical scans, MRI scans and Ultra-sound scans, individually and in combination with improved noise filtering capabilities enable generation of accurate virtual images for metaverse and 3-D holograms. This has been made easier by the using availability of high-power, high-speed processors, that comprise cluster processors and distributed processors for combining and manipulation of scan data. The medical practitioners/ professionals can use these types of images produced and displayed within the immersive metaverse or any of the other available virtual image generators usable for metaverse of 3-D holograms, as diagnostic tools, practice tools and training tools. The images produced and used in immersive virtual metaverse enable the capability for having expert consultants providing second opinions and advice over long distance by participating in and reviewing the procedure in real-time also as avatars for invasive as well as Nano/micro-Surgery, using robotics with visual coverage of the whole area of the surgery, unlike the limited view through a scope available today. This is one of the many areas that benefits most by this invention using metaverse. The real time visual capabilities provided by the immersive metaverse with the procedure and equipment spatially aligned to the patient, enable supervision and guidance of the location of robots in the wider field of the procedure within the body. The total combined view provided by the virtually immersive capability also help to reduce errors during procedure. The immersive virtual metaverse will provide accurate real-time guidance to the instruments used for procedure and placement of medicines within the human body to achieve best results, for applications such as focused radiation therapy. By using enlargement and magnification of the virtual image in metaverse virtual reality, using capabilities provided by the processing units, the metaverse, is able to provide better coverage of the area of the procedure so that the placement and movement of instruments can be more accurately followed than when guiding them when looking through a scope with limited field of view.

The availability of an immersive virtual capability with full 3-D visibility, such as implemented in in a holographic image and metaverse, of the patient, will also help the surgical team practice the operation outside the patient, before starting the procedure, so that there is reduced risk of failure. The diagnostic capability of such a technology will be substantial as experts can directly participate in the operation and understand its ramifications, in real-time, without being present on site and provide feedback to the surgeon/expert performing the procedure during planning stages as well as in real time during the procedure.

By combining high resolution scan data from scanners such as MRI, CT, or X-ray with other suitable high speed real-time scanning techniques, such as ultra-sound, the virtual environment of the metaverse enable the formation of a real-time three dimensional holographic image and immersive virtual metaverse spatially linked to the patient on the table as also the avatars of the medical practitioners within the metaverse. Hence the doctors are able to determine in real-time what is being done and where the instrumentation is and what need to be done further to complete the procedure and where to place medication within the affected regions for maximizing its impact.

Detailed Description of Invention Using Exemplary Medical Imaging System

FIG. 1 shows an exemplary and non-limiting medical imaging system 100 for extracting image data for generation of virtual immersive metaverse implementation as per one embodiment of the invention.

The patient under sedation may be located on a spatially verifiable reference generation unit (SVRU), such as a positioning platform or positioning table (SVPT) 103. The SVRU provide fixed and accurate reference points and reference surfaces which allow fixing of additional reference points around the patient and within the field of procedure for convenience and accuracy, referencing these fixed references on the platform. Using these references, the location and position of any items within the field are always referenced and recognized with relation to the reference points fixed including the SVRU such as an SVPT 103. These reference points are used for aligning and combining scan data from multiple scanning systems, such as the high-resolution scans and real-time scans to generate the combined scan data that is used to generate the necessary real-time 3-D image data for the virtual 3-D image used in the metaverse. The reference points are hence used to align the various scans from differing imaging systems used in the generation of the immersive virtual real-time image in metaverse. The scan data from multiple imaging systems are combined effectively and aligned to each other using the references, minimizing the displacement errors that can occur when using data from multiple sources.

A high-resolution imaging unit 101, (also called a high-resolution scanner) such as magnetic resonance imaging (MRI) or Computed Tomography (CT) imaging, is used to generate an accurate and high resolution scan of the patient, 104, (may be limited to the field of the procedure) under sedation. This high-resolution scan data (HRSD) is coordinated spatially with the references provided by the SVPT 103 for providing spatial alignment to any generated images. A series of ultrasonic scanning heads, that can operate individually or in combination, from an ultra-sonic imager 102, (also called ultra-sonic scanner) are placed at accurately identified coordinate locations on or around the patient with the ultra-sound transmitters and receivers in intimate contact with the patient's body, (not clearly shown in figure for clarity) to provide full coverage of the field of procedure and be also spatially coordinated with the reference points provided by the SVPT 103. The ultra-sonic scanning tech. 106 using the ultra-sonic imager 102 generate continuous scans of the field of the procedure in real time during the procedure being conducted by the doctor/surgeon/medical practitioner 105 on the patient 104. The field of the procedure in FIG. 1 for clarity of example shows the location of organs 108 and instrumentation in place 107 within the field of the procedure which are not directly visible outside the virtual reality metaverse.

The high-resolution imaging unit 101 and ultra-sonic imager 102 as well as the spatially verifiable positioning table (SVPT) 103 are linked to a high-speed data and image processing system (processing system) 110 for collection and storage of the scan data from all imaging systems and sources. The system 110 does the image processing and image data preparation, converting the collected image data to a standard format for combining and generation of the image usable by the immersive virtual metaverse. The processing system 110 may comprise at least one processor 111, a storage unit 112, that has a plurality of image data inputs to collect image data from various imaging systems, at least a program storage and multiple databases with image data storage capabilities, including image data at various stages of process and conversion, and at least an input/output (IO) terminal 113, enabling data and program input and image viewing capabilities. The scan data from the high-resolution imaging unit 101 is collected and stored in a high-resolution scan database and the ultra-sonic scan is collected and stored in a real-time scan database in the data storage unit 112.

The processing system 110 processes the spatially verifiable scan data generated by the high-resolution imaging unit 101 to convert it to image data to a standardized and usable form for generation of the image within the metaverse and/or 3-D holographic image, with spatial coordination. The processing system 110 saves the converted and standardized image data in an image database in the data storage unit 112. The processing system 110 further convert the real-time scan data from the ultra-sonic scanner 102 to the standardized format and use the real-time data combined with the high-resolution image data to generate the immersive virtual image in metaverse and/or the 3-D holographic image. The immersive virtual image in metaverse and the holographic 3-D image is updated in real-time using the real-time ultra-sound data continuously. This enable a reasonably high-resolution image to be displayed in the metaverse consistently. The real-time ultra-sonic data is also spatially coordinated with the patient and high-resolution scan data using the reference points provided by the SVPT 103, enabling the converted ultra-sonic scan updates to be fully coordinated and aligned spatially with the existing scanned image data stored in the processing system 110. This allows the processing system to generate the necessary combined image data enabling continuous updates to the virtual image in the metaverse in real-time. The real time scan data from the ultra-sonic sensors of the ultra-sonic imager, 102, hence enable real time modification of the image data and to the immersive virtual image in metaverse and or the 3-D holographic image, as procedures happen. The real time image data generated by the processor 111 as updates to the 3-D image data are also stored in a real time image database in the data storage 112 and retained for analysis as historic data of the procedure. The real time scan data is converted and used by the processor 111 to update and modify the stored image data on a continuous and real time basis. This updated image data is used for generation of the any 3-D holographic image and the virtual immersive metaverse of the embodiments of the invention.

In addition to the scan data using the multiple scanning systems the virtual universe uses a set of optical and infrared scanners to collect and combine the data surrounding the patient, this data is used to generate and expand the virtual universe surrounding the patient and allow the avatars of individual medical professionals to be present within the metaverse. By use of appropriate sensors attached to the individuals within the procedural environment the movement and actions of the individual medical professionals who are present within the operating environment are made to be replicated by their avatars within the metaverse as described previously. The processing system 110 may be used to combine and process all the data including the visible, infrared and sensor data or a separate processing system may be employed to process the visible, infrared and sensor data from the environment prior to combining it with the scan data available to create the virtual universe of the metaverse.

The processing system 110 is linked to a 3-D image generator 120 such as a holographic projector or holographic image generator, for generating the virtual 3-D image with spatial coordination of the patient, for generation of the metaverse from the combined and up-dated image data produced and manipulated for generation of the 3-D image for implementing the metaverse, by the processor 111. (as described above this may include the scan data and the other environment data used for generation of the virtual universe of metaverse.

The virtual metaverse 3-D imager using the 3-D image generator 120, such as a holographic projector, comprises at least a reference base 123 and multiple projectors 129-1 to 129-5. There is additional processing capability built into the 3-D image generator, 120, for data updating, data distribution and data manipulation. The updated image data generated by the processing system 110 is providable via data links 130-1 to 130-3 to the various projectors and external metaverse generators which working individually or together, depending on the type of imager used, enable the formation and display of the metaverse of virtual 3-D image of the patient 124 within the 3-D metaverse imager 120. The virtual 3-D image of the patient 124 will provide detailed view of the patient 124 with internal organs 128 as generated from the scan data from the high-resolution imaging unit 101 are combined with the real time scan inputs from the ultra-sonic imager 102, with spatial coordination and alignment to generate real time image data enabled to provide the view of the field of the procedure, instruments 127 being used and placement of these instruments with the field where the procedure is undertaken in real time.

The original high resolution scan data from the high-resolution image unit 101 used to generate the initial image data for the 3-D imager 120 are updated using real-time scan inputs from the ultra-sonic scanner 102 by the processing system 110, which combines the inputs in real-time in a spatially coordinated fashion by referencing the coordinates of the SVPT 103 and placement of the ultrasound sensors on the body of the patient. This real-time updated scan data is processed by the processing system 110 to continuously update the 3-D image data and generate real time 3-D image 124 of the patient with the procedure being conducted and the instrumentation used 127 and provide in the metaverse to the doctor/surgeon and to the expert advisors.

By providing a communication capability 140 (either by Wi-Fi or wired) to the processing system 120 it is possible to send the 3-D image data to remote sites by internet or other communication means, for visual following of the procedure by off-site experts, who are then able to provide advice to the doctor 105 conducting the procedure in real time while viewing the procedure in real time. It is also possible to conduct the robotic manipulations over the communication channel by an expert in remote location and hence participate in the procedure if it is necessary.

The embodiments of the invention may be described as an exemplary and non-limiting process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

FIG. 2 is a flow chart of a spatially linked 3-D hologram and metaverse development in real-time of the patient and the field encompassing the procedure area, for procedures as per an embodiment of the invention.

The patient is sedated and placed on a spatially verifiable stage or positioning table (SVPT) that provides three-dimensional (3-D) reference points around the patient that are referenced by the multiple scanning systems to align the collected scan data and hence eliminate displacement errors that are possible when combining the scans from different scanning systems and scans taken at different times. S201.

One or more scans are taken of the patient encompassing the field of procedure using a high-resolution scan unit such as MRI or CT scan to cover all the details of the patient and the field of the procedure. S202.

The high-resolution scan data are collected by a processing system and saved in a scan data database in the storage unit of the processing system. S203.

The high-resolution scan data is processed by the processing system to convert it to a standardized format suitable for combining with other scan data from other scan systems and to generate high resolution 3-D image data ready for feeding the 3-D image generation system, such as 3-D holographic projectors. The 3-D image data is stored in an image database in the storage unit of the processing system. S204.

The image data is sent to the 3-D image generator to enable the image generator to produce the high resolution 3-D image of the patient. This forms the base image of the patient and the field of procedure for the generation of the initial metaverse or the holographic 3-D image combining with real time image data for use during the procedures. S205.

An ultra-sonic scanning system or a low intensity X-ray system with multiple sensors is used to generate the real-time scan data from which to produce the real-time image data. The transmitting and receiving sensors used for real-time imaging are positioned in spatially coordinated manner, with coordinates identified with respect to the available reference points already existing, on and around the patient. These sensors provide optimal image scans and collect continuous real-time image data from the field of procedure. S206.

The real-time image data is collected by the processing system in real-time and saved in a real-time scan database in the storage unit of the processing system. S207.

The real time scan data collected by the processing system is also converted to the standard format by the processing system, when necessary, and used to generate real-time image data which is also stored in a real-time image data base in the storage unit of the processing system. S208.

The real-time image data is further used by the processor to update the image data available from the high-resolution scans on the processing system in real-time with spatial alignment and coordination using the reference points set up and referenced during high-resolution and ultra-sonic or low level X-ray scanning. The reference points enable the image data from the multiple scans from multiple scanning systems to be integrated in a seamless fashion to produce real time 3-D capable image data of the patient. And the surrounds. S209.

The real-time updated 3-D image data is sent to the 3-D imaging system where it is used by the 3-D imaging system to generate real-time continuously updating image of the patient and the instrumentation that are spatially aligned and coordinated in a verifiable way with the patient for the virtual Universe of the metaverse display and for generation of 3-D holograms when needed S210.

The generated spatially coordinated real time 3-D image displayed by the 3-D imaging system is also useable for visual tracking and execution of the procedures using robotics and other instruments by the experts. S211.

Description of Invention (Using Exemplary Lab Experiment Imaging System)

FIG. 3, 300 shows an exemplary embodiment of the system as per the invention wherein a Lab setup for demonstration of an experiment.

Today as shown in FIG. 3, when a teacher 302 in a laboratory (lab) 301 is demonstrating an experiment 304 to a set of students 303, with the results of the experiment being presented 305 to the students in the lab. The students within the Lab 301 are able to ask questions and clarifications 306 about the experiment and the results.

By enabling sensors that scan and capture the volume of the lab, including the teacher 302, the surround of the teacher 301, the students 303 in the class/Lab and the experiment 304 as it happens, using appropriate sensors and combining the inputs from the various sensors using pre-established alignment a composite data stream of the teacher 302, the students 303 the lab and the experiment 304, the result 305 as it takes place can be generated and used for providing the capability as a 3-D image stream usable for 3-D image generation on a screen or 3-D holographic image generation. The image data stream can also be used to create a virtual universe of metaverse where the teacher 302 and students 303 are involved in the experiments as avatars and are able to discuss 306 the experiment 304 and the results 305.

The generation and use of the metaverse also enable the participation of remote learning students in the experiment development and procedure as well as discussions as their avatars from the remote location.

The generated 3-D data stream can also be stored for retrieval later for future teaching engagements.

Embodiments of the invention may be implemented with the use of a machine-readable medium having stored thereon instructions which program the processor to perform some, or all of the operations described above. A machine-readable medium may include any mechanism for storing or transmitting information in a form readable by a machine (e.g., a computer), such as Compact Disc Read-Only Memory (CD-ROMs), Read-Only Memory (ROMs), Random Access Memory (RAM), and Erasable Programmable Read-Only Memory (EPROM). In other embodiments, some of these operations might be performed by specific hardware components that contain hardwired logic. Those operations might alternatively be performed by any combination of programmable computer components and fixed hardware circuit components.

While the invention has been described in terms of several embodiments, those of ordinary skill in the art will recognize that the invention is not limited to the embodiments described but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

What is claimed is:

1. A system for enabling teaching of remote learning students at remote locations, the system comprising;
    at least a plurality of diverse sensing and scanning systems enabled to sense data and generate a data stream of all of a sensed volume of a region, that comprises a teacher, a surround of the teacher including his actions, a site of experiment and instruments used; and at least a processing capability;
        wherein the at least the processing capability is a high-power high-speed processing capability;
        wherein the plurality of diverse sensing and scanning systems comprise sensing and scanning systems of varying resolutions; and
        wherein the sensed data from the plurality of diverse sensing and scanning systems comprising some that require extensive processing for consolidation and combining, and some that does not;
        wherein all sensed data is received, processed, standardized, consolidated, and combined by the at least the processing capability in real time using pre-defined reference points established within the sensed volume of the region for alignment of the sensed data received to generate the data stream;
    the at least the processing capability is enabled to receive the sensed data from the plurality of diverse sensing and scanning systems and process the data to output a real time 3-D image data stream, that is updated continuously in real time with spatial coordination and alignment using pre-established reference points as alignment capability within the sensed volume of the region;
    wherein the at least the processing capability comprising the any and all of one processor, cluster of processors, distributed processors;
    wherein the output 3-D image data stream produced and updated in real-time is sent to remote locations to be provided to image generators at remote locations;
    wherein the image generators are enabled to generate a virtual reality immersive metaverse at remote locations for teaching and training of remote learning students by enabling them to participate in an experiment development and procedure as well as discussions as their avatars from the remote location; and
        wherein by providing an enlargement and magnification capability of the virtual image in metaverse virtual reality, using capabilities provided by the at least the processing capability, the system is able to provide to students using the enlargement and magnification capability at remote locations, a better coverage of the site of the procedure, including the teacher and his actions, so that the experiments including the placement and movement of instruments used can be more accurately viewed and followed by the students at the remote locations.

2. The system of claim 1, wherein the surround comprises a laboratory where an experimental set-up is established.

3. The system of claim 1, wherein the surround comprises an operating theater where students are taught operating procedures on patients.

4. The system of claim 1 wherein the plurality of diverse sensing and scanning systems comprise real-time sensing and scanning systems and sensors.

5. The system of claim 4, wherein the 3-D image data stream sent to the remote locations is also enabled to produce a real time updating 3-D holographic image using a holographic image generator.

6. The system of claim 5, wherein the system comprise at least a memory coupled to the at least the processing capability wherein the 3-D image data stream is stored in the at least the memory.

7. The system of claim 6, wherein the real time generated and stored image data streams are enabled to generate an image of the sensed volume of the region, using processing power built into the image generator for use in generation of the virtual reality immersive metaverse or the real-time virtual 3-D holographic image.

8. The system of claim 7, wherein the generated virtual reality immersive metaverse or the 3-D image is usable for teaching and training of students.

9. A method for teaching students at a remote location, the method comprising:
    generating and using an image data stream by combining image data generated from scans from a plurality of multiple diverse types of scanning and sensing systems of a field of coverage comprising a volume of a region that comprise a teacher, a surround of the teacher, a lab, a site of experiment and instruments used;
    the method of generating further comprising:
    receiving by at least a high-power, high-speed processing capability configured for receiving the image data from the plurality of multiple diverse types of scanning and sensing systems;
        wherein the plurality of multiple diverse types of scanning and sensing systems are of varying resolutions covering the volume of the region;

processing by standardizing and combining the image data received to generate a 3-D image data stream in real time with spatial coordination using pre-defined reference points established within the volume of the field of coverage comprising the volume of the region using the at least the high-power, high-speed processing capability;

sending the generated 3-D image data stream to the remote location for teaching the remote learning students;

wherein the 3-D image data stream is used by an image generator having a processing capability therein to produce a virtual reality immersive metaverse or a real-time virtual 3-D holographic image of the field of coverage comprising the volume of the region; and wherein the method by providing the remote learning students the capability, by using enlargement and magnification of the virtual image in metaverse virtual reality, using processing capability of the image generator, to have a better visual coverage of the area of the experiment including the placement and movement of instruments so that the students at the remote locations are able to follow the experiment details.

10. The method of claim 9, wherein the plurality of multiple diverse types of scanning and sensing systems comprise high-resolution scanning and sensing systems and real time scanning and sensing systems.

11. The method of claim 9, wherein the at least the high-power, high-speed processing capability is used to combine the image data from the plurality of multiple diverse types of scanning and sensing systems to output the continuously and in real time updating 3-D image data stream to be sent to the remote location.

12. The method of claim 11, wherein the real time up dating 3-D image data stream sent to the remote location is to a 3-D image generator where it is used to generate a virtual universe of metaverse of the field of scan that is used for teaching the remote learning students by enabling them to participate in an experiment development and procedure as well as discussions as their avatars from the remote location.

13. The method of claim 12, wherein the updating 3-D image data stream is saved in a memory for retrieval at a later date to teach students.

14. The method of claim 13, wherein a virtual 3-D holographic image generated from the real time up dating image data stream is used for teaching and training of students;

Wherein enabling the students at the remote location to use enlargement and magnification of the virtual image, the method is able to provide better visual coverage of the area of the experiment including the placement and movement of instruments to the students at the remote location, so that the students at the remote locations are able to follow the experiment details.

15. The method of claim 13, wherein the stored image data stream is usable to re-create the virtual universe of the metaverse or the 3-D holographic image for teaching and training purposes;

wherein the students at the remote location are enabled to enlarge and magnify the virtual image; and wherein using enlargement and magnification of the virtual image; the method is able to provide better visual coverage of the area of the experiment including the placement and movement of instruments so that the students at the remote locations are able to follow the experiment details.

16. The method of claim 15, wherein the memory is associated with the 3-D image generator.

17. The method of claim 16, wherein the remote location students are enabled to access the stored 3-D image data stream at a later date for learning purposes.

\* \* \* \* \*